US010902445B2

(12) United States Patent
Elias et al.

(10) Patent No.: US 10,902,445 B2
(45) Date of Patent: Jan. 26, 2021

(54) LOCATION EVALUATION

(71) Applicant: INTERNATIONAL BUSINESS MACHINES CORPORATION, Armonk, NY (US)

(72) Inventors: Guilherme S. Elias, Sumare (BR); Tiago D. Generoso, Minas Gerais (BR); Chee Y. Lai, Hortolandia (BR); Marcos Vinicius L. Paraiso, Campinas (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 512 days.

(21) Appl. No.: 15/810,352

(22) Filed: Nov. 13, 2017

(65) Prior Publication Data
US 2019/0147468 A1 May 16, 2019

(51) Int. Cl.
*G06Q 30/02* (2012.01)
*G06N 20/00* (2019.01)
(Continued)

(52) U.S. Cl.
CPC ......... *G06Q 30/0205* (2013.01); *G06F 7/026* (2013.01); *G06N 20/00* (2019.01); *G06Q 50/01* (2013.01); *H04W 4/023* (2013.01)

(58) Field of Classification Search
CPC .... G06Q 30/0201; G06Q 30/02; G06Q 30/06; G06Q 30/0205; G06F 11/3438
(Continued)

(56) References Cited

U.S. PATENT DOCUMENTS 5,680,305 A 10/1997 Apgar, IV
7,412,398 B1 8/2008 Bailey
(Continued)

OTHER PUBLICATIONS

Yang, J., et al., Abstract: "An AHP Decision Model for Facility Location Selection" [retrieved on Aug. 11, 2017]. Retrieved from the Internet: <URL: http://www.emeraldinsight.com/doi/pdfplus/10.1108/02632779710178785>, Facilities, vol. 15 Issue: 9/10, pp. 241-254, 1997.

(Continued)

*Primary Examiner* — Johnna R Loftis
(74) *Attorney, Agent, or Firm* — Michael O'Keefe; Matthew M. Hulihan; Heslin Rothenberg Farley & Mesiti PC

(57) ABSTRACT

Data-driven evaluation of locations for a proposed business is provided by a method that includes identifying and weighing business success attributes for a desired business segment and business segment requirements for a proposed business, identifying candidate locations, calling to devices to request attribute data for the business success attributes, obtaining success rates and attribute data for other businesses, ranking the candidate locations on anticipated success of the proposed business, and generating digital documents informing of the candidate locations, providing at least some of the attribute data, and identifying a preferred location, of the candidate locations, for the proposed business. Aspects also include refining a database indicating the business success attributes, weights thereof, and business segment requirements applicable to different business segments, based on historical performance of businesses in the different business segments to identify relevant business success attributes and relative importance thereof as an indicator of business success.

21 Claims, 7 Drawing Sheets

(51) Int. Cl.
   *G06Q 50/00* (2012.01)
   *G06F 7/02* (2006.01)
   *H04W 4/02* (2018.01)
(58) Field of Classification Search
   USPC .............................................. 705/7.29, 7.34
   See application file for complete search history.

(56) References Cited

U.S. PATENT DOCUMENTS

| | | | |
|---|---|---|---|
| 7,640,196 | B2 | 12/2009 | Weiss |
| 7,797,188 | B2 | 9/2010 | Srivastava |
| 7,987,111 | B1 | 7/2011 | Sharma et al. |
| 8,239,245 | B2 | 8/2012 | Bai et al. |
| 8,332,259 | B1 | 12/2012 | Zias et al. |
| 8,938,686 | B1 * | 1/2015 | Erenrich .......... G06Q 10/06395 |
| | | | 715/771 |
| 10,103,953 | B1 * | 10/2018 | Chang ................ G06Q 10/0639 |
| 10,579,647 | B1 * | 3/2020 | Allsopp ................ G06F 16/287 |
| 10,706,434 | B1 * | 7/2020 | Brainard ............ G06Q 30/0205 |
| 2004/0015434 | A1 | 1/2004 | McCue et al. |
| 2005/0171877 | A1 * | 8/2005 | Weiss .................... G06Q 30/02 |
| | | | 705/35 |
| 2009/0076888 | A1 * | 3/2009 | Oster ..................... G06Q 10/10 |
| | | | 705/7.34 |
| 2009/0083128 | A1 | 3/2009 | Siegel |
| 2009/0089149 | A1 * | 4/2009 | Lerner ................ G06Q 10/047 |
| | | | 705/7.34 |
| 2014/0039983 | A1 * | 2/2014 | Vinson ............... G06Q 30/0205 |
| | | | 705/7.36 |
| 2014/0201093 | A1 | 7/2014 | Bishop, III et al. |
| 2014/0278768 | A1 * | 9/2014 | Zenor ................ G06Q 30/0202 |
| | | | 705/7.31 |
| 2014/0358630 | A1 * | 12/2014 | Bhagat ............... G06Q 30/0201 |
| | | | 705/7.29 |
| 2015/0169709 | A1 * | 6/2015 | Kara ..................... G06F 16/248 |
| | | | 707/736 |
| 2017/0061346 | A1 * | 3/2017 | High .................. G06Q 10/0639 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

LOCATION EVALUATION

BACKGROUND

The physical location of a business can factor greatly into whether the business is a success, and the consideration and evaluation of the right location can consume a significant investment of money and time. The monetary expenditure to buy or rent a location, construct and fit the business, create and implement the initial marketing and advertising, hire employees, and perform other activities to get the business going can be significant. Selection of the proper location is important for many other reasons as well. Existing approaches for evaluating candidate locations for a proposed business are cumbersome, expensive, and lack accuracy.

SUMMARY

Shortcomings of the prior art are overcome and additional advantages are provided through the provision of a computer-implemented method for data-driven evaluation of locations for a proposed business, computer system configured to perform a method for data-driven evaluation of locations for a proposed business, and computer program product having a computer readable storage medium readable by at least one processor and storing instructions for execution by the processor for performing a method for data-driven evaluation of locations for a proposed business. The method refines, over time by a continuous learning engine, a database indicating business success attributes, weights for the business success attributes, and business segment requirements applicable to different business segments. The refining is based in part on an analysis of historical performance of businesses in the different business segments to identify relevant business success attributes and relative importance thereof as an indicator of business success. The method receives input of a desired business segment for a proposed business and an indication of a location parameter for the proposed business. The method identifies in the database business success attributes for the desired business segment and business segment requirements for the proposed business. The method processes digital map data selected based on the location parameter. The processing identifies candidate locations, for the proposed business, for evaluation. The method weighs each of the identified business success attributes based at least in part on weights of the identified business success attributes as indicated in the database. The method calls to one or more devices to request attribute data of each of the candidate locations. The attribute data is for the identified business success attributes. The method obtains success rates for other businesses in the desired business segment and attribute data, of locations of those other businesses, for the identified business success attributes. The method ranks the candidate locations on anticipated success of the proposed business at each candidate location. The ranking is based on success rates of other businesses having attribute data correlating to the attribute data of the candidate locations and on the assigned weights of the business success attributes. The method generates digital documents informing of the candidate locations, providing information, including at least some of the attribute data, about each of the candidate locations, and identifying a preferred location, of the candidate locations, for the proposed business.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
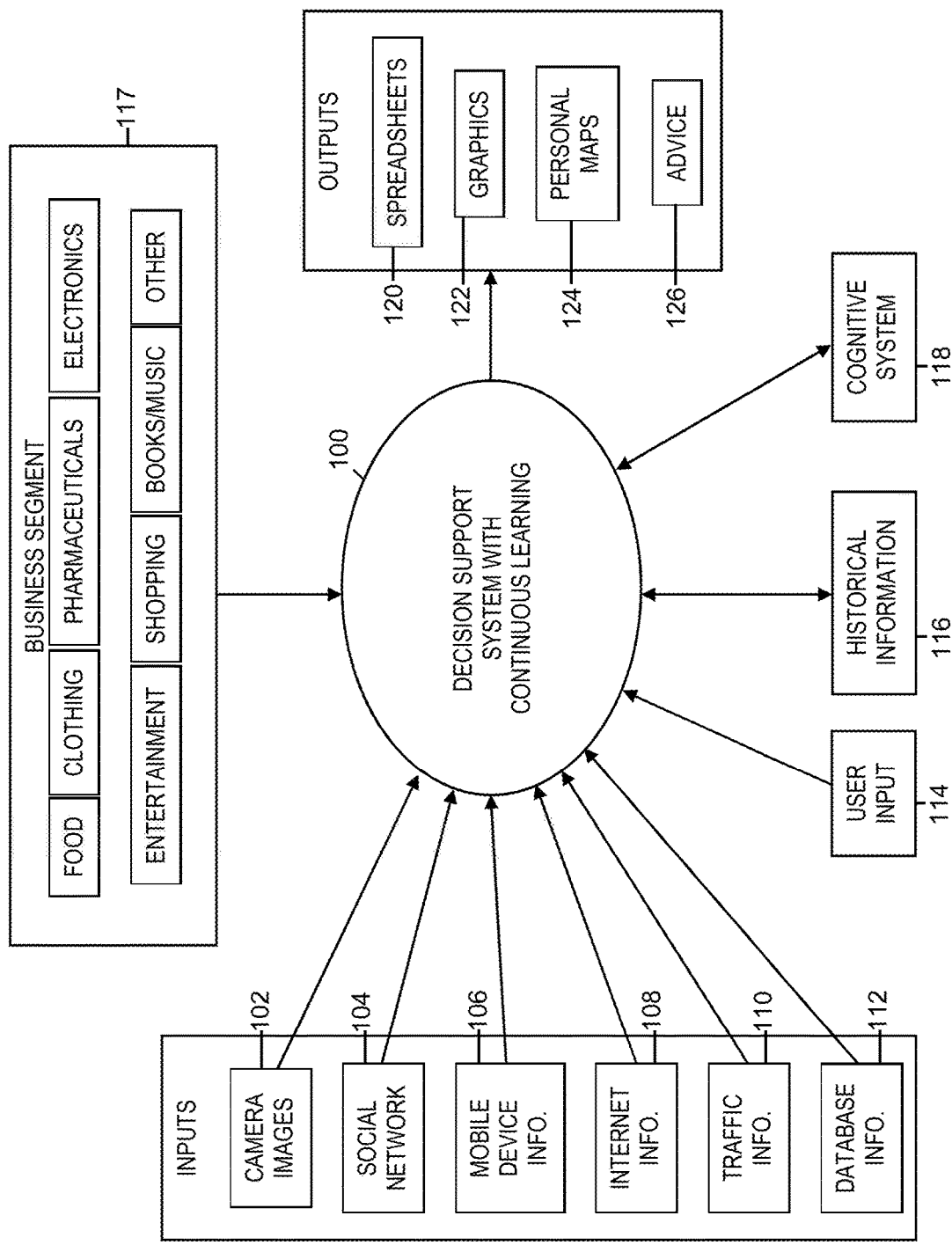
FIG. 1 depicts an example conceptual diagram of a decision support system with continuous learning, in accordance with aspects described herein.

Described herein are facilities for data-driven evaluation of locations for a proposed business. An intelligent, relatively fast and inexpensive way to support the decisions as to where to open a physical business is provided by analyzing important factors/attributes of business success and applying them to candidate locations. A process consumes business success attribute data from several public and/or private sources such as cameras, social network information, internet information, mobile device information, particular databases, and others. Aspects cross-reference to successful and unsuccessful cases of other businesses and generate outputs to support a decision as to where to physically locate a proposed business. A decision support system learns with the decision history and also with the success/failure of other business, such as those of a same business segment as the proposed business. Although success/failure may be explicitly indicated by user input to the system, in some aspects business success/failure is ascertained automatically by calling on various data, such as social media comments about a business, the business's website, and other websites for indications of closure, as examples.

A process creates a ranking of the best places for the proposed business of a desired business segment by scoring streets, neighborhoods, cities, etc. at any desired granularity to anticipate success rate of the proposed business of the desired business segment. Various outputs, such as digital documents in the form of maps, spreadsheets, graphs and the like are generated for support in identifying the best location.

In some aspects, a cognitive system analyzes attribute data provided from several sources, the attribute data being for the business success attributes, and the analysis taking into account the relative influence of those attributes, e.g. weighing more heavily those attributes that are identified as being most relevant. The cognitive system also analyzes competitor success rates of candidate locations. Additionally, it learns over time as it provides advice, obtaining feedback and improving future analyses. It compares the attribute data gathered about candidate locations and the characteristics of those locations in the form of scoring by relevant criteria to create a ranking of the candidate locations for the proposed business.

This differs from approaches where a proprietor searches for a desirable location in a neighborhood in which the business is to be placed, speaks with a real estate broker for rental costs, taxes, applicable laws, etc., ascertains where competitors are located, finds information about the proposed business and the proximity to existing businesses, analyzes the reputation of a proposed location and its security based on interviews and other means, performs online research and physical inspection of the locale, and performs observations of the traffic and activity of a candidate location. Such practice may be resource-intensive, and inefficient, and inaccurate.

Evaluation of a proposed physical location to open a business can consider many different factors. With the objective of analyzing physical store locations, a proprietor makes an investment of money and other resources into assessing, for the location, traffic/accessibility, reputation, competition/business expansion, and/or costs/laws/zoning requirements, as examples.

With respect to the traffic/accessibility assessment, manual labor may be applied to analyze the location or hire a company to do so. The information gained is an indication and characterization of the people and vehicles passing the location, as well as building size. With respect to reputation assessment, interviews, internet research, real estate broker conversations, and the like are performed to ascertain information about the security, neighborhood, potentially applicable demographic assessments, proposed product acceptance, etc. With respect to competition/business expansion analysis, interviews, internet research, and possibly expensive reports, research or other information is obtained to understand what kind of business is good for the given location and any lessons learned, e.g. from past experience. With respect to costs/laws/zoning requirements analysis, efforts in research and professional input inform of taxes and salary requirements, government incentives, workforce availability, and rent prices, as examples.

Under the above approach, questions may remain as to whether the analyses were even correct in the first place, whether the proper methods were used to obtain relevant information, what information is relevant, whether enough resources were put into funding proper assessments, and whether the data is properly correlated. In short, a significant investment is needed and may not be efficient. Specialists may not be able to analyze all possibilities, and important items and correlations can be left behind as the background of a location may not be accurately reflected in what was gathered. The decision as to the location for the proposed business may be premised on a faulty analysis, leading to wasted resources.

In specific examples described herein, particular business success attributes, also referred to as factors, to be analyzed for evaluating locations for a proposed business include: (i) traffic (e.g. pedestrian/vehicular), (ii) accessibility (e.g. ease of parking and access), (iii) reputation of the location (e.g. security, notoriety, etc.), (iv) proximity of other businesses (complimentary, competing, etc.), (v) costs (e.g. taxes, employee salaries, government incentives, workforce availability, etc.), (vi) laws, regulations and other requirements (e.g. zone regulations, licensing requirements, etc.), (vii) proximity to target market, (viii) expansion/growth plans/opportunities for the business, and (ix) historical weather/climate of the location.

FIG. 1 depicts an example conceptual diagram of a decision support system with continuous learning, in accordance with aspects described herein. The decision support system (DSS) 100 is fed a variety of input attribute data for business segment attributes that are relevant in anticipating success of a proposed business at a given location. The input attribute data in this example includes camera images 102, social network activity (posts, check-ins, etc.) 104, mobile device information 106, internet information 108, pedestrian and vehicle traffic information 110, and database information 112. DSS also accepts user input 114 and historical information 116. All of the gathered information may be relevant to various business segments 117 that the DSS 100 considers, including (in this example) food, clothing, pharmaceuticals, electronics, entertainment, shopping, books/music and other. The DSS 100 leverages a cognitive system 118 hosting specialized analytical systems that help analyze and parse the attribute data to ascertain meaning and significance of that data.

The DSS 100 generates and provides various output to one or more computer systems, in this example in the form of digital documents including spreadsheets 120, graphics 122, personal maps 124, and other advice 126.

Figure 2:
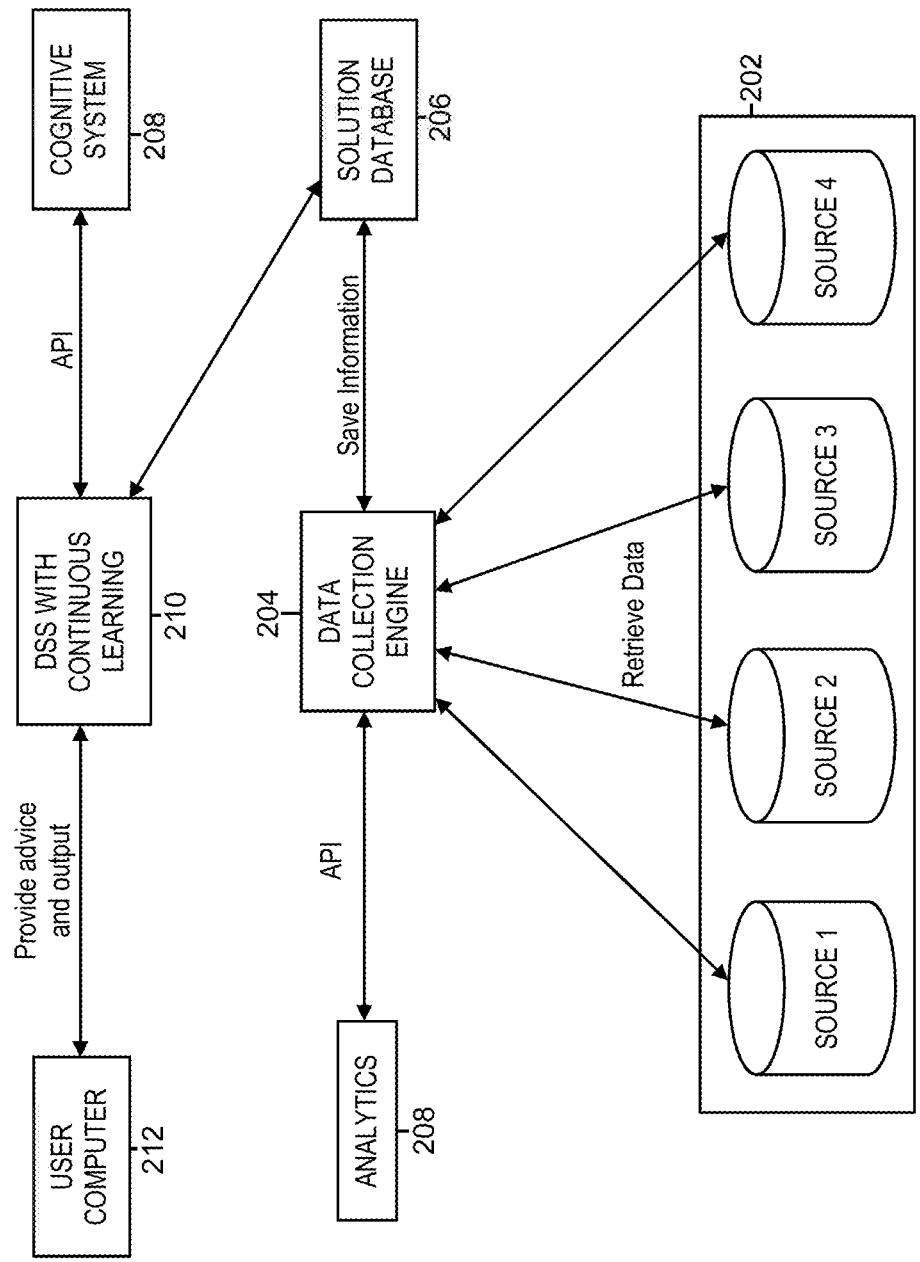
FIG. 2 depicts an example environment to incorporate and use aspects described herein.

FIG. 2 depicts an example environment to incorporate and use aspects described herein. Sources 202 are the sources from which attribute data is collected, in this example by a data collection engine 204. A source may be sensor(s) or device(s), such as public or private camera systems capturing images or video, mobile or other computer systems, databases, or any other source. Additionally or alternatively, sources can be websites or any other information source, such as social network information, internet information, mobile device information, such as location information from the user smartphones indicating GPS information. Data collection engine 204 is any engine (processes, algorithms, computer software/hardware, etc.) capable of harvesting or retrieving such information from multiple sources. In some examples, the data collection engine 204 incorporates a web search engine to crawl internet sites and harvest information therefrom.

The data collection engine 204 reads and stores information to a solution database 206, which can serve as the primary data store for collected data, historical analysis/performance information, and any other information. Data collection engine 204 also leverages analytics facilities 208 via application programming interface (API) calls for various analytics functions described herein.

Cognitive system 208 is, in this example, a specialized application that helps with image recognition, learning based on historical performance, and result rankings and output.

The decision support system 210 is the central entity interacting with the rest of the components and users 212 (i.e. computer systems used by the users), analyzing the information provided by solution database 206, and interacting with the cognitive system 208 to provide final advice and output when considering candidate locations for a proposed business.

The DSS with continuous learning engine refines, over time, a database (e.g. 206) indicating factors, i.e. business success attributes, weights for those business success attributes, and business segment requirements, representing business segment needs applicable to different business segments. The refining is based on several items. One is an analysis of historical performance of businesses in the different business segments to identify relevant business success attributes and relative importance thereof as an indicator of business success. In this regard, the refining continually identifies with more accuracy which factors are most relevant for which business segments, and also the practical weights of those factors relative to each other.

Figure 3:
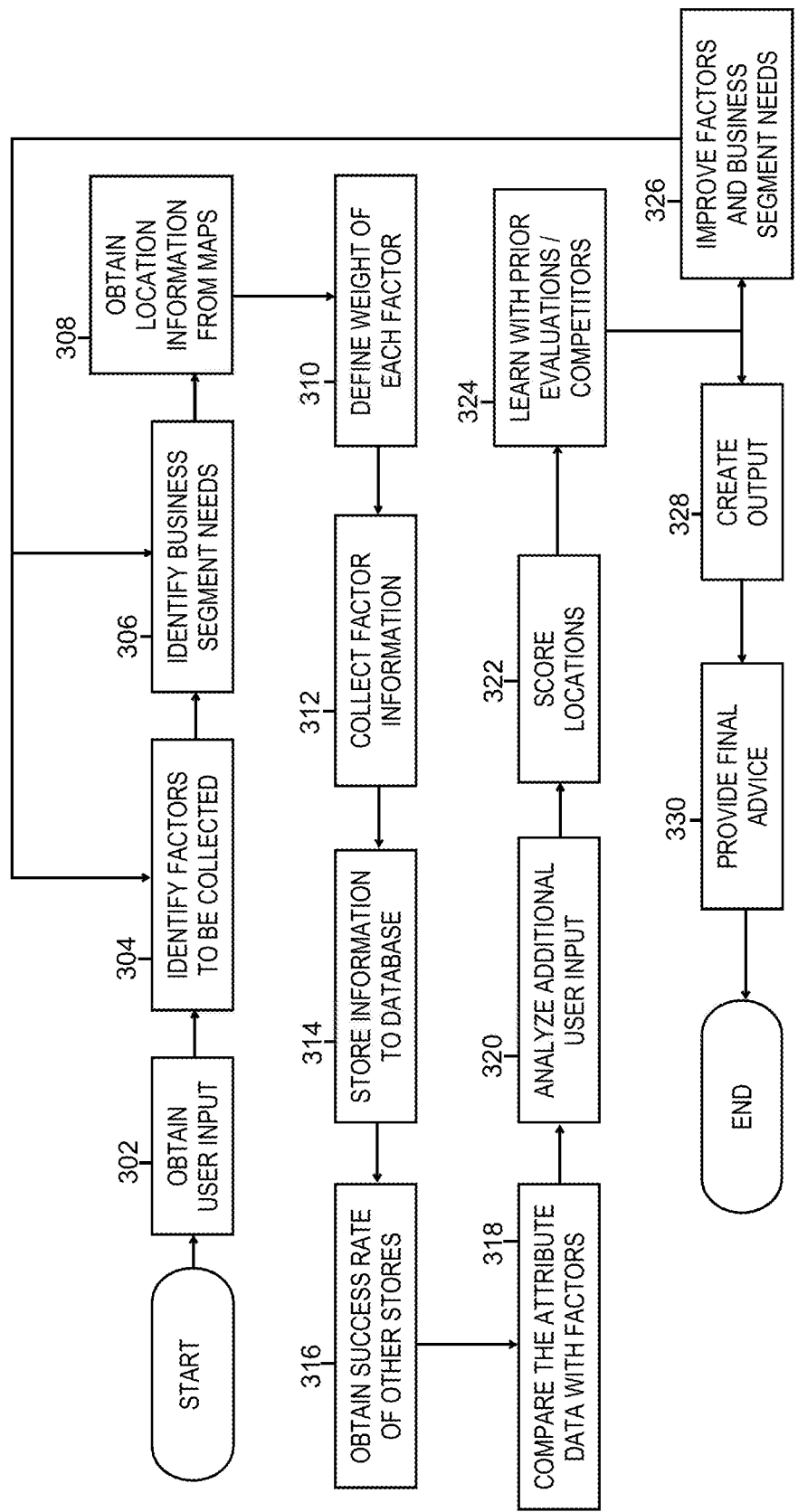
FIG. 3 depicts an example process for data-driven evaluation of locations for a proposed business, in accordance with aspects described herein.

Aspects are further described with reference to a specific embodiment of a process for data-driven evaluation of locations for a proposed business, as depicted in FIG. 3. The process is performed by one or more computers collectively or individually forming one or more computer system(s).

Initially the process obtains user input (302), in which a user inputs an indication of a desired business segment for a proposed business. Business segments can be defined in any way desired. Example business segments include convenience stores, supermarkets, retail clothing shops, casual dining, home improvement stores, and office space, as examples. In addition, the user could also specify a location parameter for the proposed business, designating a location, locale, region, or the like. For instance, the user could indicate a given town, county, city, street, etc. that dictates a search area for candidate locations, providing a boundary/search area for a search of candidate locations. If the user fails to specify a location, a default may be selected. One possibility of a default is a region within some distance (e.g. 5 miles) of the user's current geolocation, as detected from a global positioning system or other location service of a computer system the user uses to interact with the DSS. In some examples, the user is presented with a map for the user to select or delineate the location parameter.

In a particular example, the location parameter includes a geographic region, roadway, and/or municipality indicated by the user-input.

Continuing with FIG. 3, the process identifies the business success attributes ("factors") for which information is to be collected (304). As an example, this aspect identifies the nine factors explained above and/or the most important factors for the specified business segment. For instance, it can identify in the database (e.g. 206) business success attributes for the desired business segment indicated by the user. In some examples, the process performs analysis of historical performance of businesses in the different business segments and the relevant business success attributes and relative importance thereof as an indicator of business success.

By way of specific example, if the user-specified proposed business and segment is 'food store', it may be the case that pedestrian traffic, accessibility of the store by car and foot for shoppers and deliveries, and the proximity of other businesses (for instance an office building or school) are the most significant factors indicated of anticipated business success. The system can self-identify the important factors based on machine learning over time and experience, as discussed herein.

The process of FIG. 3 also identifies the business segment needs, in other words requirements of the proposed business (306). Using the example of a food store, business segment needs/requirements might be a business license for sale and handling of food, and health-related procedures and surveillance that the business must undertake. The system can learn of these requirements in any of various ways, for instance by information-gathering from websites and/or a user/administrator entering-in the requirements to the database, as examples.

The process obtains candidate location information from, e.g., online maps (308) based on the location parameter. In some examples, the system makes API calls to map programs/websites to identify city, streets, neighborhoods, addresses, or the like in the form of digital map data to identify locations that fit the location parameter. This is used to identify places at, in, or near the location/area that forms the location parameter. Digital map data is processed, for example to identify candidate locations based on the location parameter for the proposed business. These candidate locations will be evaluated and ranked.

The identified candidate locations can be of any desired/specified granularity. Thus, the locations can be of any specificity or generality. For instance, they could be specific addresses, entire roadways or roadway segments (e.g. a city 'block'), neighborhoods, any municipal delineations, or any combination of the foregoing, as examples.

The process continues by defining a weight for each of the identified business success attributes based on the business segment and information collected (310). In particular, and as described in further detail below, the solution database can include weighting information for the business success attributes most relevant to the identified business segment, and the weights for the factors of the instant process can be based at least in part on weights of the identified business success attributes as indicated in the database. Weights can be tailored based on any desired parameters, examples of which include information contained on websites of other businesses, specialist information, and continuous learning. In some examples, the weights for the attributes for the candidate locations will be exactly as indicated in the database. In other examples, the weights may be manually or automatically adjusted. Such adjustment may be desired to account for particularities of each situation, for instance the particular identified candidate locations.

After the business success attributes have been identified (i.e. at 304), the process triggers a search to collect attribute data, across those attributes, for each of the candidate locations (312). As noted, a data collection engine can collect this information from the sources by leveraging analytics APIs, for instance. Calls can be made to one or more devices to request attribute data of each of the candidate locations, the attribute data being for the identified business success attributes. Thus, there are business success attributes, e.g. factors like traffic volume, weather, costs, reputation, etc., and attribute data for those attributes, e.g. data that informs of the values of each of those factors across the candidate locations. In the food store example, attribute data could include information about foot traffic, car traffic, social network information (comments about the candidate locations and check-ins, for instance), neighborhood reputation, competitor proximity, anticipated costs, weather information, and so on.

In examples where the attribute data includes social network activity (posts, check-ins, etc.) on one or more social networks, calling to the one or more devices can include harvesting the social network activity from social media site servers, the social network activity providing an evaluation of one or more of the identified business success attributes for one or more of the candidate locations. Social network posts might inform about the positive, or negative as the case may be, reputation of a business or location, and check-ins might inform about traffic volume and the types of individuals who frequent that area, lending insight into the presence of a target market, for example.

In examples where the attribute data includes geolocation information from mobile devices, API calling to one or more devices can include requesting the geolocation from the mobile devices or a server hosting such data. Geolocation information can be leveraged to ascertain the traffic volume of a location at different times, for example.

Attribute data can also include images captured from candidate location(s) and depict traffic volume, for instance pedestrian (foot, bicycle) and vehicular traffic volume. The API calling to one or more devices can include in this case requesting images obtained by one or more camera devices. The images may be obtained directly from the camera devices in real-time, or from a cache, buffer, repository, or other storage device that stores captured images/video. This image data can be analyzed to ascertain traffic volume in candidate location(s). Aspects described herein can also use video analyses as an input to create a micro-census providing more information about the demographic of visitors to a location and provide a more efficient analysis.

Collected information and results of the process are stored to the solution database (314), for instance as structured and/or unstructured data.

The process also obtains success rate of other businesses of the same or similar business segment and having same or similar characteristics of any of the candidate locations, as ascertained based on the information collected by the process to that point (316). Accordingly, success rates for other businesses in the desired business segment are obtained, as is attribute data, of locations of those other businesses, for the identified business success attributes. The success rates for the other businesses can account for, i.e. be determined based at least in part on, whether the other businesses remain open for business. A consideration of whether a business with similarity to the proposed business in terms of its segment and attribute data for a given location remains open therefore may factor into the assessment of its success.

In this aspect, the process obtains (e.g. at least in part from the solution database) the characteristics of other businesses, for instance foot traffic, car traffic, costs, neighborhood reputation, competitor proximity, etc., and determines the success rate of those businesses under those characteristics—which businesses remain open, which ones are closed, and how many people use social network check-ins at these businesses, as examples. The process can also analyze any historical advice the system has rendered for these locations and business, and assess, retroactively, how accurate the advice was. This analysis of historical performance of businesses in the different business segments can help to identify through continuous learning the relevant business success attributes and relative importance thereof as an indicator of business success.

The process continues by comparing/correlating the attribute data collected with the most important factors identified for the subject business segment (318). For example, using the food store scenario, the correlating may identify that it is most important to build/locate the business at a location with high foot traffic volume. The attribute data for a given location might show the desired high level of foot traffic volume for that given location, suggesting this location might be a good location for the business. In some examples, the most important factors to be analyzed may be identified from information on the internet, as this information may be ascertainable from various websites.

Aspects also allow for users to supply additional input, and the process can receive and analyze that additional user input (320). This allows users to manually provide/specify any special requirements, needs, parameters, or the like. The process obtains any further user parameters of the proposed business, and a ranking of the candidate locations, described in further detail herein, may be based further on the user parameter(s). As an example, a user might provide an indication of size requirements or anticipated short-term expansion of the physical retail space of the proposed business. This could be factored into the proposed location evaluation, for instance as space requirements and building permits that may be needed.

Based on the information collected, the process scores the locations creating a ranking of the candidate locations to open the business (322). The ranking is a ranking of the candidate locations on anticipated success of the proposed business at each of those candidate locations. The ranking is based on any combination of the information gained or determinations made in the process of FIG. 3, for instance the success rates of other businesses having attribute data correlating to the attribute data of the candidate locations, and the assigned weights of the business success attributes. In this aspect, the solution will start to cross the information collected, for example the locations, reputations, etc. with the success rate, costs, foot traffic and other attribute data to create a ranking of the candidate locations in terms of anticipated success of the proposed business at each those locations. Additionally, business segment needs can factor into the scoring. For instance, the difficulty and expense in obtaining a license for a given location can impact the score for that location. Additionally, candidate locations can be complete ruled out when appropriate, for instance if it is impossible to obtain a necessary permit or other approval for that location because of zoning or other restrictions.

One aspect of the process is the continual learning based on previous evaluations and competitor information (324) to improve on and refine the identified business success attributes and business segment needs (326). This also incorporates refining of the weights associated with the business success attributes. In this aspect, the process includes feedback (as arrows returning to 304 and 306) representing the refining, over time by a continuous learning engine, of the solution database indicating business success attributes, weights for the business success attributes, and business segment requirements applicable to different business segments. The refining may be based in part on analyses of historical performance of businesses in the different business segments to identify the most relevant business success attributes and relative importance thereof, i.e. to figure out which factors are relevant for which segments and the practical weights of those factors as an indicator of business success. Refining the business segment requirements can also be based on ascertaining the business segment requirements from various sources, such as internet websites and user-provided indications of business requirements.

In this manner, the scoring and rankings (322) can be based on what is observed in the historical data about businesses whose attribute data correlates with the attribute data of the given location (i.e. similar traffic volume, weather, etc.).

Based on the scoring and rankings of the candidate locations, the process continues by creating output (328), for instance digital documents that inform of the candidate locations, provide information, such as pertinent attribute data, about each of the candidate locations, and identify a preferred location, of the candidate locations, for the proposed business. Digital documents can include spreadsheets, graphs, maps with the locations to open the physical store, and any other digital documents. A spreadsheet can rank the locations in terms of anticipated success based on the attribute data collected about each of the locations for instance. In a particular example, digital maps geographically depict the candidate locations and depict rankings of anticipated success of the candidate locations relative to each other. For instance, color coding, sizing, and any other characteristics of the graphical elements can be configured to convey results of the process.

Finally, the process provides final advice regarding best or preferred candidate location(s). The advice may be provided in the digital documents themselves, for instance by highlighting the top one or more locations. In some aspects, the process highlights advantages or disadvantages of top-ranked location(s), and can show any desired level of the analysis that went into forming rankings. It can present to a user the correlations made between actual attribute data for the various business success attributes for each of the locations, enabling users to see the justification and basis behind the rankings. The user may re-rank the locations, if desired.

Example technology to implement aspects described herein include:

- To collect large scale data from different sources, leverage technology used in 'big data' analytics, for instance IBM Spectrum Conductor™ (offered by International Business Machines Corporation, Armonk, N.Y., U.S.A.) with Apache Spark™, Apache Hadoop® or Apache Toree (IBM SPECTRUM CONDUCTOR is a trademark of International Business Machines Corporation; APACHE, APACHE SPARK, and APACHE HADOOP are trademarks of the Apache Software Foundation, Wakefield, Mass., U.S.A.).
- To transform collected data, leverage modern Extract-Transform-Load facilities, for instance InfoSphere® DataStage® offered by International Business Machines Corporation, of which INFOSPHERE and DATASTAGE are registered trademarks.
- To analyze collected data, leverage analytics and cognitive systems, for instance Watson™ Knowledge Studio, the Watson™ Alchemy Language API, Watson™ Explorer Content Analytics, SPSS®, PureData® System for Analytics, InfoSphere® Streams, InfoSphere® BigInsights® and/or Social Media Analytics, all offered by International Business Machines Corporation, of which WATSON, SPSS, PUREDATA, and BIGINSIGHTS are trademarks.
- To analyze images from cameras, leverage cognitive APIs to recognize images, for instance the Watson™ Visual Recognition API offered by International Business Machines Corporation.
- For continuous learning based on historical information, leverage analytics and predictive systems for instance Watson™ Explorer Content Analytics, the Watson™ Retrieve and Rank API, and/or SPSS® Modeler, offered by International Business Machines Corporation.
- To generate digital map documents, leverage cognitive APIs, for instance the Watson™ Alchemy Data News API offered by International Business Machines Corporation.
- For decision support, leverage optimization systems, for instance SPSS® Analytical Decision Management, and/or IBM ILOG® CPLEX® offered by International Business Machines Corporation, of which ILOG and CPLEX are registered trademarks.
- To generate reports, leverage analytics report systems, for instance Cognos® Business Intelligence offered by International Business Machines Corporation, of which Cognos is a registered trademark.

Figure 4:
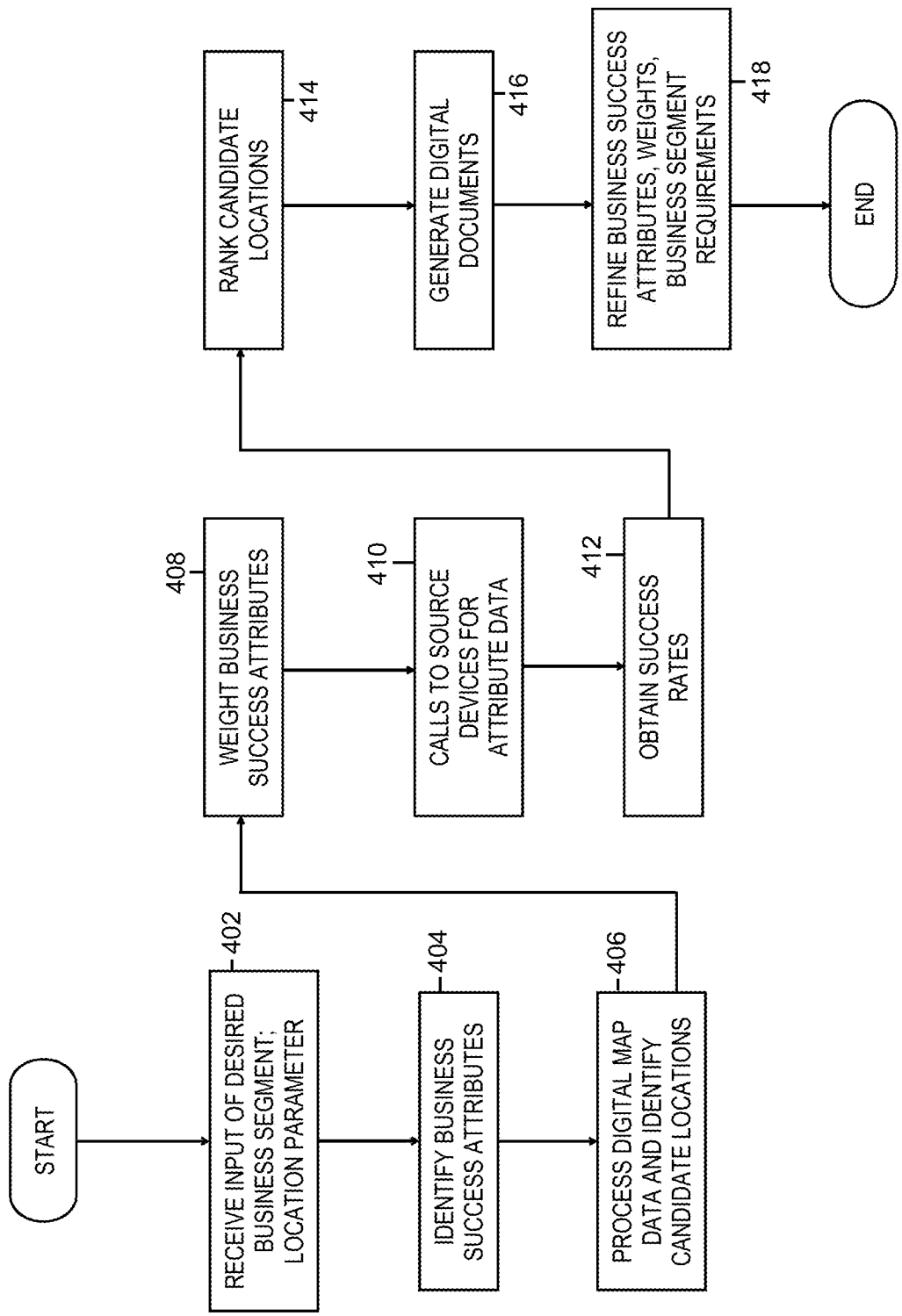
FIG. 4 depicts another example process for data-driven evaluation of locations for a proposed business, in accordance with aspects described herein.

FIG. 4 depicts another example process for data-driven evaluation of locations for a proposed business, in accordance with aspects described herein. In some examples, the process is performed by one or more computer systems, such as those described herein, which may include one or more decision support systems implemented by computer system(s). A "computer system" can refer to both individual computer systems as well as a collection of individual computer systems.

The process includes receiving input of a desired business segment for a proposed business and an indication of a location parameter for the proposed business (402). The input is provided by and obtained from a user, as one example, and indicates a business segment and optionally the location parameter. The location parameter may indicate some boundary on the search area. In the absence of a user-provided location parameter, the system could use a default based on the user's location.

The location parameter can include one selected from the group consisting of: a geographic region, a roadway, and a municipality, indicated by user-input. In this regard, the user can limit the scope of search for candidate locations to a geographical region, roadway, municipality (town, city, etc.), or similar.

As noted, the location parameter can additionally or alternatively include a default selected based on an absence of a user-provision of the location parameter, the default being a geolocation of a user.

The process continues by identifying in a solution database business success attributes for the desired business segment and business segment requirements for the proposed business (404).

The process processes digital map data selected based on the location parameter and identifies candidate locations, for the proposed business, for evaluation (406). The identified candidate locations can be of a specified granularity, for instance one selected from the group consisting of: specific addresses, roadways, and neighborhoods.

The process weighs each of the identified business success attributes (408) based at least in part on weights of the identified business success attributes as indicated in the database.

Having identified the business success attributes at 404, the process calls to one or more devices to request attribute data of each of the candidate locations (410). The attribute data is for the identified business success attributes, i.e. data reflecting the location-specific values for the business success attributes. For instance, the attribute data can include social network activity such as posts and check-ins on one or more social networks. The calling to the one or more devices can include harvesting the social network activity, where the social network activity provides an evaluation of at least one of the identified business success attributes for at least one of the candidate locations. For instance, consensus among the posts might inform about the positive or negative reputation of the business, check-ins might provide an idea of foot traffic, and the types of users who post might provide an indication of a target market.

Additionally or alternatively, the attribute data can include geolocation information from mobile devices, where the calling to one or more devices includes requesting the geolocation from the mobile devices, for instance to ascertain traffic volume of a location.

In some examples, the attribute data includes images captured from at least one of the candidate locations and depicts traffic volume, where the calling to one or more devices includes requesting images obtained by one or more camera devices to ascertain traffic volume in the at least one of the candidate locations, and making calls to an API for analyzing the images.

The process also obtains success rates for other businesses in the desired business segment and attribute data, of locations of those other businesses, for the identified business success attributes (412). This can reflect characteristics of each of the locations of other businesses. The success rates for the other businesses can account for whether the other businesses remain open for business.

The process then ranks the candidate locations on anticipated success of the proposed business at each candidate location (414). The ranking can be based on success rates of other businesses having attribute data correlating to the attribute data of the candidate locations and on the assigned weights of the business success attributes. Thus, in this aspect, ranking may be based at least in part on what is observed in the historical data about businesses whose characteristics, as indicated from attribute data, correlate with the attribute data of the given location (for instance, similar traffic volume, weather, etc.). The weights also factor in by influencing the relative importance of the attributes in the ranking being performed.

The process generates digital documents informing of the candidate locations, providing information, including at least some of the attribute data, about each of the candidate locations, and identifying a preferred location, of the candidate locations, for the proposed business (416). Digital documents can include digital maps geographically depicting the candidate locations and depicting rankings of anticipated success of the candidate locations relative to each other.

In addition, the process refines, over time by a continuous learning engine, the database that indicates business success attributes, weights for the business success attributes, and business segment requirements applicable to different business segments (418). This refining may be based in part on the analysis of historical performance of businesses in the different business segments to identify relevant business success attributes and relative importance thereof as an indicator of business success. It is noted that this refining may be on a continuous (to mean periodically or iteratively) basis over time.

Refining the business segment requirements may be based on ascertaining the business segment requirements from automated crawling of internet websites and user-provided indications of business requirements, as examples.

Additionally or alternatively, the process of FIG. 4 can include obtaining a further user parameter of the proposed business, for instance parameter(s) that the user wants factored in but the system may not necessarily be able to ascertain otherwise. The ranking in these cases may be based further on the user parameter.

Accordingly, described herein are aspects providing data-driven evaluation of locations for a proposed business. Although various examples are provided, variations are possible without departing from a spirit of the claimed aspects.

Figure 5:
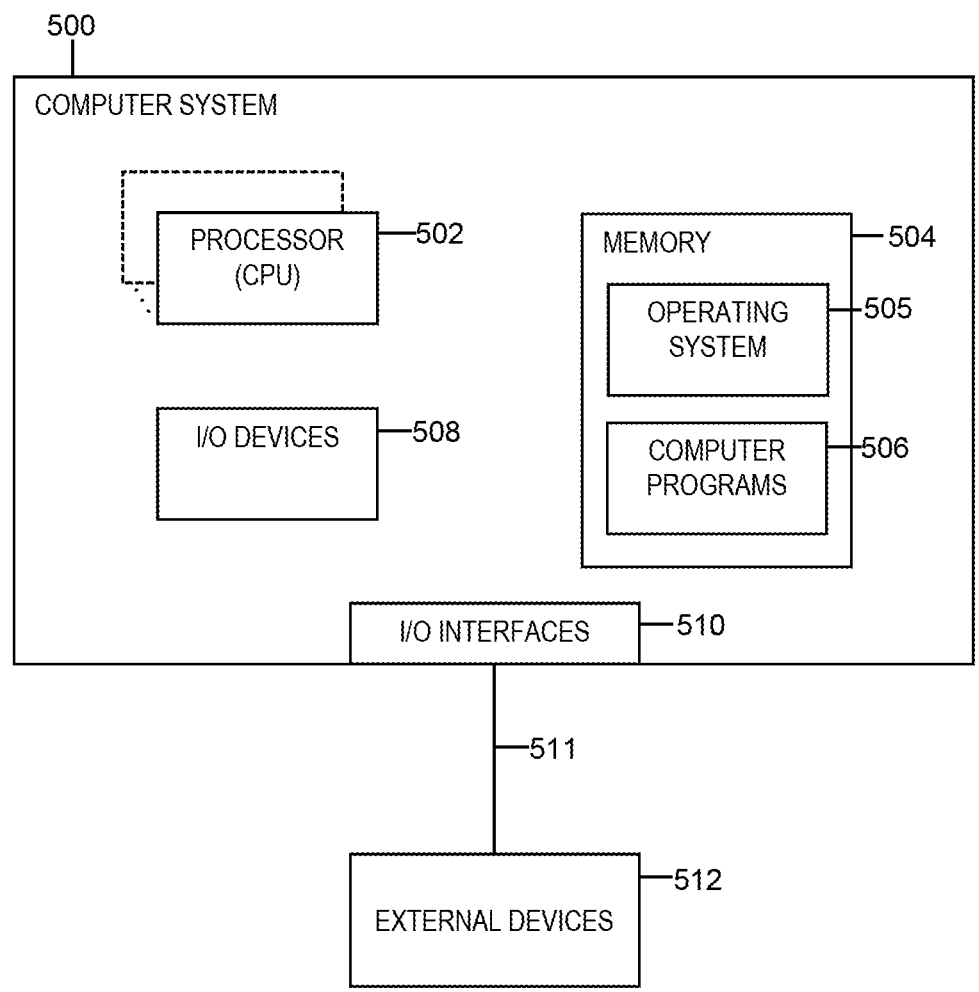
FIG. 5 depicts one example of a computer system and associated devices to incorporate and/or use aspects described herein.

Processes described herein may be performed singly or collectively by one or more computer systems, such as one or more decision support systems and/or computer systems in communication therewith. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
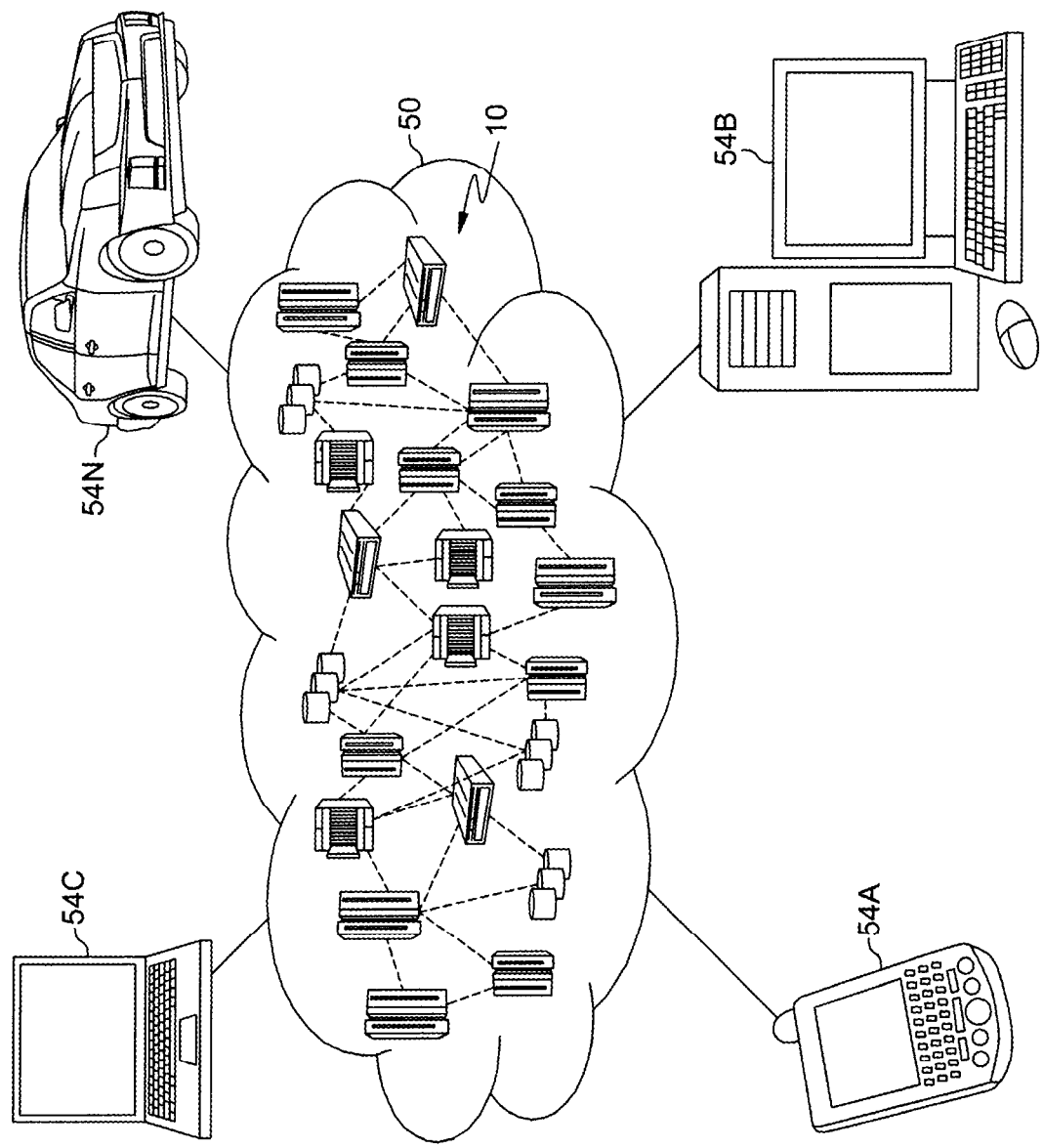
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
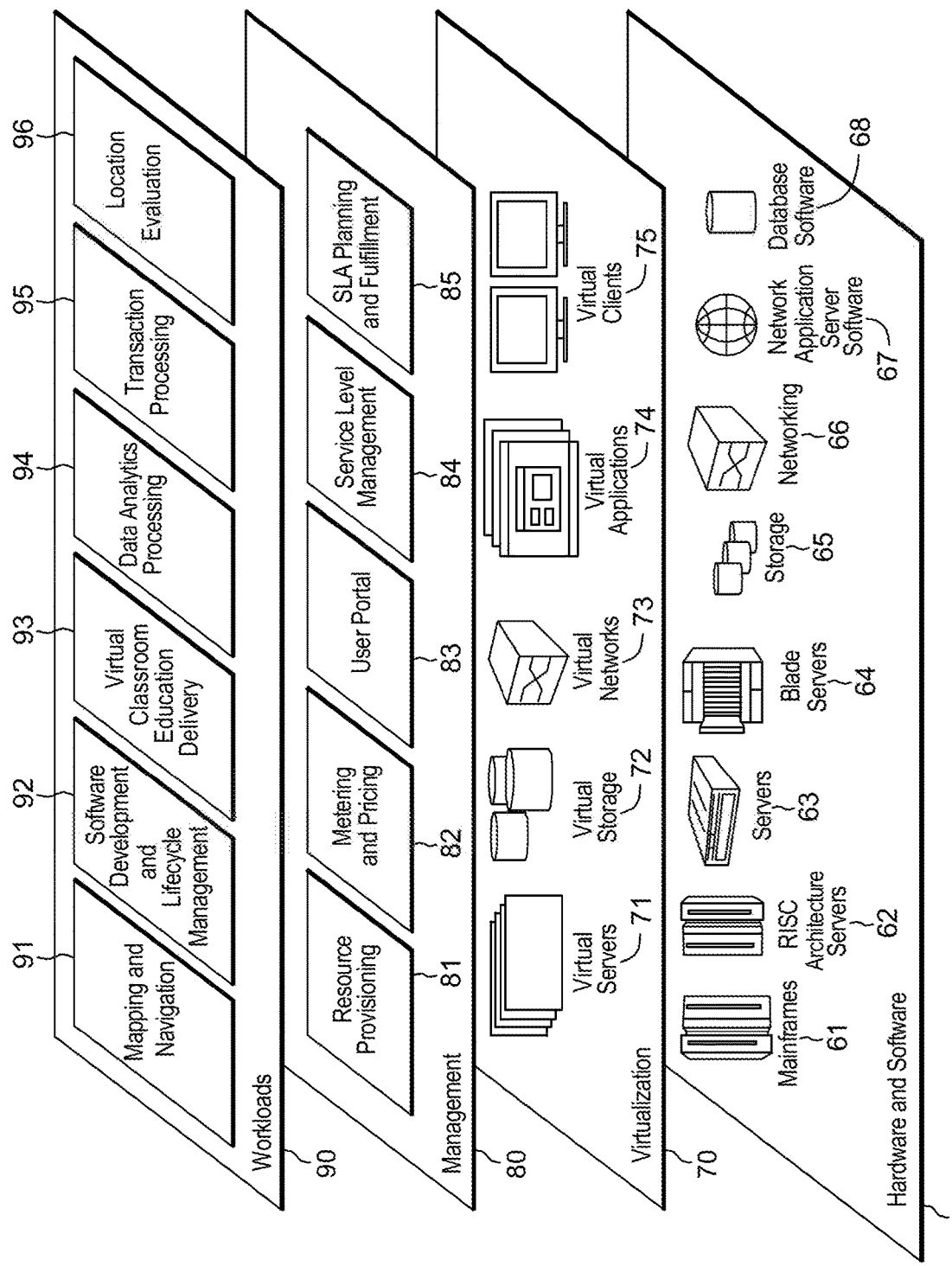
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and location evaluation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for data-driven evaluation of locations for a proposed business, the method comprising:
   refining, over time by a continuous learning engine, a database indicating business success attributes, weights for the business success attributes, and business segment requirements applicable to different business segments, the refining being based in part on an analysis of historical performance of businesses in the different business segments to identify relevant business success attributes and relative importance thereof as an indicator of business success;
   receiving input of a desired business segment for a proposed business and an indication of a location parameter for the proposed business;
   identifying in the database business success attributes for the desired business segment and business segment requirements for the proposed business;
   processing digital map data selected based on the location parameter, the processing comprising obtaining candidate location information from online maps via application programming interface calls to online map services based on the location parameter, and identifying candidate locations, for the proposed business, for evaluation;
   weighting each of the identified business success attributes based at least in part on weights of the identified business success attributes as indicated in the database;
   calling to network-connected devices to request attribute data of the candidate locations, the attribute data being for the identified business success attributes, the network-connected devices comprising one or more mobile devices that provide, in response to the calling, sensor-obtained geolocation information as part of the attribute data, one or more devices providing camera images, as part of the attribute data, obtaining from at least one camera device of at least one of the candidate locations, and one or more social media site servers providing social media activity as part of the attribute data;
   obtaining success rates for other businesses in the desired business segment and attribute data, of locations of those other businesses, for the identified business success attributes;
   ranking the candidate locations on anticipated success of the proposed business at each candidate location, the ranking being based on success rates of other businesses having attribute data correlating to the attribute data of the candidate locations and on the assigned weights of the business success attributes; and
   generating digital documents informing of the candidate locations, providing information, including at least some of the attribute data, about each of the candidate locations, and identifying a preferred location, of the candidate locations, for the proposed business, the digital documents comprising one or more digital maps geographically depicting at least one of the candidate locations.

2. The method of claim 1, wherein the social network activity provides an evaluation of at least one of the identified business success attributes for at least one of the candidate locations.

3. The method of claim 1, wherein the calling to the one or more mobile devices requests the geolocation of the one or more mobile devices.

4. The method of claim 1, wherein the camera images depict traffic volume at the at least one of the candidate locations.

5. The method of claim 1, wherein the success rates for the other businesses account for whether the other businesses remain open for business.

6. The method of claim 1, further comprising obtaining a further user parameter of the proposed business, wherein the ranking is based further on the user parameter.

7. The method of claim 1, wherein the identified candidate locations are of a specified granularity selected from the group consisting of: specific addresses, roadways, and neighborhoods.

8. The method of claim 1, wherein the location parameter comprises one selected from the group consisting of: a geographic region, a roadway, and a municipality, indicated by user-input.

9. The method of claim 1, wherein the location parameter comprises a default selected based on an absence of a user-provision of the location parameter, the default being a geolocation of a user.

10. The method of claim 1, wherein refining the business segment requirements is based on ascertaining the business segment requirements from automated crawling of internet websites and user-provided indications of business requirements.

11. The method of claim 1, wherein the one or more digital maps depict rankings of anticipated success of the candidate locations relative to each other.

12. A computer system for data-driven evaluation of locations for a proposed business, the computer system comprising:
   a memory; and
   a processor in communication with the memory, wherein the computer system is configured to perform a method comprising:
      refining, over time by a continuous learning engine, a database indicating business success attributes, weights for the business success attributes, and business segment requirements applicable to different business segments, the refining being based in part on an analysis of historical performance of businesses in the different business segments to identify relevant business success attributes and relative importance thereof as an indicator of business success;
      receiving input of a desired business segment for a proposed business and an indication of a location parameter for the proposed business;
      identifying in the database business success attributes for the desired business segment and business segment requirements for the proposed business;
      processing digital map data selected based on the location parameter, the processing comprising obtaining candidate location information from online maps via application programming interface calls to online map services based on the location parameter, and identifying candidate locations, for the proposed business, for evaluation;

weighting each of the identified business success attributes based at least in part on weights of the identified business success attributes as indicated in the database;

calling to network-connect devices to request attribute data of the candidate locations, the attribute data being for the identified business success attributes, the network-connected devices comprising one or more mobile devices that provide, in response to the calling, sensor-obtained geolocation information as part of the attribute data, one or more devices providing camera images, as part of the attribute data, obtained from at least one camera device of at least one of the candidate location, and one or more social media site servers providing social media activity as part of the attribute data;

obtaining success rates for other businesses in the desired business segment and attribute data, of locations of those other businesses, for the identified business success attributes;

ranking the candidate locations on anticipated success of the proposed business at each candidate location, the ranking being based on success rates of other businesses having attribute data correlating to the attribute data of the candidate locations and on the assigned weights of the business success attributes; and generating digital documents informing of the candidate locations, providing information, including at least some of the attribute data, about each of the candidate locations, and identifying a preferred location, of the candidate locations, for the proposed business, the digital documents comprising one or more digital maps geographically depicting at least one of the candidate locations.

13. The computer system of claim 12, wherein the social network activity provides an evaluation of at least one of the identified business success attributes for at least one of the candidate locations.

14. The computer system of claim 12, wherein the calling to the one or more mobile devices requests the geolocation of the one or more mobile devices.

15. The computer system of claim 12, wherein the camera images depict traffic volume at the at least one of the candidate locations.

16. The computer system of claim 12, wherein the success rates for the other businesses account for whether the other businesses remain open for business.

17. The computer system of claim 12, wherein the identified candidate locations are of a specified granularity selected from the group consisting of: specific addresses, roadways, and neighborhoods.

18. The computer system of claim 12, wherein the location parameter comprises one selected from the group consisting of: a geographic region, a roadway, and a municipality, indicated by user-input.

19. The computer system of claim 12, wherein the one or more digital maps depict rankings of anticipated success of the candidate locations relative to each other.

20. A computer program product for data-driven evaluation of locations for a proposed business, the computer program product comprising:

a computer readable storage medium readable by a processor and storing instructions for execution by the processor for performing a method comprising:

refining, over time by a continuous learning engine, a database indicating business success attributes, weights for the business success attributes, and business segment requirements applicable to different business segments, the refining being based in part on an analysis of historical performance of businesses in the different business segments to identify relevant business success attributes and relative importance thereof as an indicator of business success;

receiving input of a desired business segment for a proposed business and an indication of a location parameter for the proposed business;

identifying in the database business success attributes for the desired business segment and business segment requirements for the proposed business;

processing digital map data selected based on the location parameter, the processing comprising obtaining candidate location information from online maps via application programming interface calls to online map services based on the location parameter, and identifying candidate locations, for the proposed business, for evaluation;

weighting each of the identified business success attributes based at least in part on weights of the identified business success attributes as indicated in the database;

calling to network-connected devices to request attribute data of the candidate locations, the attribute data being for the identified business success attributes, the network-connected devices comprising one or more mobile devices that provide, in response to the calling, sensor-obtained geolocation information as part of the attribute data, one or more devices providing camera images, as part of the attribute data, obtained from at least one camera device of at least one of the candidate location, and one or more social media site servers providing social media activity as part of the attribute data;

obtaining success rates for other businesses in the desired business segment and attribute data, of locations of those other businesses, for the identified business success attributes;

ranking the candidate locations on anticipated success of the proposed business at each candidate location, the ranking being based on success rates of other businesses having attribute data correlating to the attribute data of the candidate locations and on the assigned weights of the business success attributes; and generating digital documents informing of the candidate locations, providing information, including at least some of the attribute data, about each of the candidate locations, and identifying a preferred location, of the candidate locations , for the proposed business, the digital documents comprising one or more digital maps geographically depicting at least one of the candidate locations.

21. The computer program product of claim 20, wherein the social network activity provides an evaluation of at least one of the identified business success attributes for at least one of the candidate locations, wherein the calling to the one or more mobile devices requests the geolocation of the one or more mobile devices, and wherein the camera images depict traffic volume at the at least one of the candidate locations.

\* \* \* \* \*